Dec. 15, 1953  E. G. MITCHELL ET AL  2,662,270
MANUFACTURE OF LAMINATED STRUCTURES
Original Filed July 1, 1943
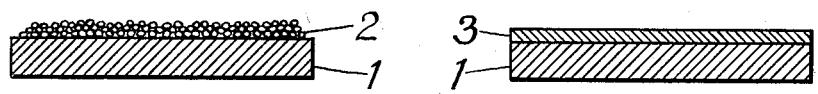
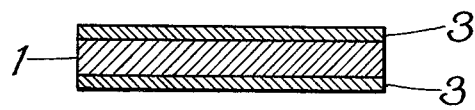
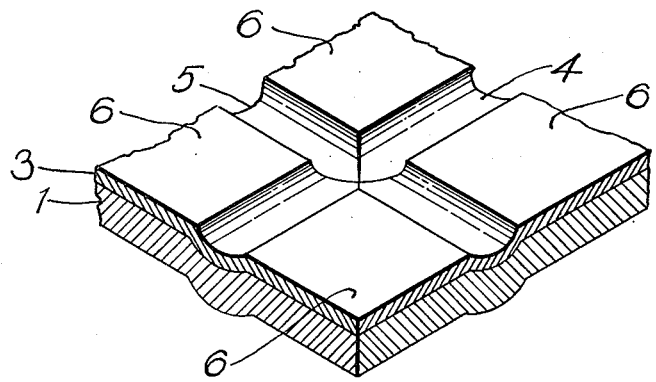
INVENTORS
Edmund G. Mitchell & DeWilton B. Timberman
BY
Lionel E. Goff
ATTORNEY Patented Dec. 15, 1953

2,662,270

UNITED STATES PATENT OFFICE 2,662,270

MANUFACTURE OF LAMINATED STRUCTURES

Edmund G. Mitchell, Alton, Ill., and De Wilton B. Timberman, New Haven, Conn., assignors to Olin Industries, Inc., East Alton, Ill., a corporation of Delaware Original application July 1, 1943, Serial No. 493,150, now Patent No. 2,445,858, dated July 27, 1948. Divided and this application January 16, 1948, Serial No. 2,635

8 Claims. (Cl. 29—148)

This invention relates to composite laminated structures and particularly to a novel method of producing such a structure having a surface layer of a copper-phosphorus brazing alloy. This application is a division of U. S. Patent 2,445,858, issued to Edmund G. Mitchell, July 27, 1943.

Copper-phosphorus brazing alloy has long been known in the art and in its simplest composition consists of a copper base alloy containing about 2% to 10% of phosphorus, about 8.3% phosphorus being preferred since this composition forms a eutectic alloy melting at the relatively low temperature of about 707° C.

Heretofore, such alloy has been used as a brazing solder in the form of rod or wire. The use of such rod or wire has been attended by the disadvantage that it is of extremely brittle character and even a slight bending in some instances is sufficient to cause it to crack and shatter, thus making it very difficult to apply. The alloy has also been prepared in the form of a thin strip or sheet for insertion between the metal parts to be brazed, but this method of application has also been attended by disadvantages, such as the difficulty in working the alloy into thin strips of sufficient width, brittleness of the strip, difficulty in manipulating such insertions, and the like, all detracting from its usefulness.

The application of copper-phosphorus alloy in brazing operations has accordingly presented many difficulties and it is an object of this invention to provide a novel method of application of the alloy free of such disadvantages.

Another object of the invention is to provide a novel method for producing composite laminated metal structures.

Another object of the invention is to provide a novel method for producing laminated metal sheet adapted for further working into shapes designed to form parts of composite articles.

Another object of the invention is to provide copper-phosphorus alloy in a form facilitating its use as a brazing solder.

Other objects and advantages will be apparent from the following detail description and drawing, in which:

Figure 1 is a sectional view of a metal sheet illustrating the first stage in the formation of a laminated metal sheet according to one embodiment of this invention, and Figure 2 is a sectional view of a laminated metal sheet illustrating one embodiment of the invention, and Figure 3 is a sectional view of a laminated metal sheet illustrating another embodiment of the invention, and Figure 4 is a sectional view of a metal structure illustrating another embodiment of the invention.

In accordance with this invention, there is provided a surface layer of a copper-phosphorus brazing alloy on at least one of a plurality of copper-base metal parts which are to be joined by brazing or spot-welding, and the like. It has now been found that the disadvantages ordinarily resulting from the inherent brittleness of the brazing alloy are overcome when the brazing alloy is utilized as an adherent surface layer on the metal structures to be joined since mechanical handling of the brazing alloy as such in the brazing operation is thereby obviated. Further in the very thin surface layer needed for the brazing operation the alloy assumes a flexibility and ductility not available with thicker sections or pieces, acting in this respect somewhat similar to such brittle materials as glass and the like which in thin sections have a surprising amount of flexibility.

The objects and advantages are attained, in accordance with this invention, by the provision of a novel method in which the surface to be coated is covered with the brazing alloy in powdered form and heat is then applied. The brazing alloy upon melting flows into a relatively dense layer of uniform thickness which upon cooling strongly adheres to the surface in a fusion-bond, forming the novel laminated structure of this invention. Where the laminated structure is to be further worked as by drawing, bending or other shaping operations, it has now been found that a pickling of the brazing alloy surfaces in a bath containing an oxidizing agent, preferably nitric acid, greatly increases its ductility and workability, so that such shaping operations can ordinarily be accomplished without any deleterious cracking or flaking or the like of the layer of brazing alloy.

Before applying the layer of brazing alloy, it is necessary that the metal surface to be coated be free of any metallic oxides and foreign materials such as dust, oil or grease, chemical salts and the like. The surface may be cleaned in any suitable manner, for instance by employing any of the well-known pickling and degreasing operations employed for removing such metal oxides and foreign materials.

In the operation of applying the brazing alloy, in which elevated temperatures usually above the melting point of the alloy are employed for an extended period of time, it is necessary that the heating be carried out in an inert or slightly reducing atmosphere in order to avoid oxidation of the phosphorus content of the brazing alloy. Similarly, when the laminated structure of this invention is employed in a brazing operation, for instance by heating in a furnace, this heating operation must likewise be carried out in a non-oxidizing atmosphere to prevent oxidation of the phosphorus. In such operations as spot welding and the like, in which the metal is heated for only a very short period of time, it is not usually necessary to carry out the heating in a non-oxidizing atmosphere, since no harmful oxidation of the phosphorus ordinarily occurs in such very short heat treatments.

By way of example, following is a detail description of the preparation of a laminated metal sheet illustrating one embodiment of this invention.

A sheet of deoxidized copper about 0.020 inch thick, having its surface suitably cleaned, for instance by immersion in a degreasing bath of carbon tetrachloride or other suitable solvent and immersion in a pickling bath, containing about 10% sulphuric for about 15 minutes at a temperature of about 60° C. followed by thorough washing, is coated with an alloy composed of about 8.3% phosphorus and the balance substantially copper, in the form of powder, for instance having a particle size passing through a 200 or 250 mesh screen. About 45 grams of the brazing alloy powder is employed per square foot of the surface to be coated and the powder is disposed in a substantially uniform layer on the surface. This amount of brazing alloy provides a final layer of the alloy about 0.002 inch thick. More or less of the powder may be employed, depending on the thickness of the final layer of brazing alloy desired, and brazing alloy layers of from 0.001 to 0.003 inch thickness have been found entirely suitable for most purposes, although in some instances thicker or thinner layers may be employed.

The sheet may have any desired length and width, these dimensions being determined by the ultimate purpose for which the laminated structure is to be employed. For instance, the sheet may be in the form of relatively long strip which after coating with brazing alloy is used as such or is cut into the desired shapes, or the sheet may be in the form of squares, circles, triangles or other symmetrical shapes or irregular shapes prior to coating with the brazing alloy.

The powder-coated sheet, for instance as illustrated in Figure 1, with the sheet 1 and powdered brazing alloy 2, is then heated in a furnace having a slightly reducing atmosphere, for instance natural gas of high methane content for about 5 minutes at a temperature above the melting point of the brazing alloy, preferably in the range of about 715° C. to 780° C. The sheet is then cooled in a natural gas atmosphere until it is sufficiently cold that no oxidation occurs upon contact with atmospheric oxygen. At such elevated temperatures the particles of powder are melted and flow to form a uniform dense layer which upon cooling results in the formation of a laminated structure, for instance as illustrated in Figure 2 with the copper sheet 1 and the adherent thin layer of copper-phosphorus brazing alloy 3 joined thereto in a fusion-bond.

The laminated sheet so formed may without further treatment be readily united to copper-base metal, for instance, deoxidized copper, brass, bronze or the like, merely by heating in a suitable atmosphere with the laminated sheet having its brazing alloy surface in contact with the copper-base metal.

It is preferred, however, to first pickle the laminated sheet in a bath containing an oxidizing agent, in order to obtain the advantage provided by having a clean metal surface and to obtain the resulting increased ductility of the copper-phosphorus brazing alloy. This may be readily accomplished by immersing the laminated sheet in about a 50% solution of nitric acid for about one-half minute, or so, at room temperature and then washing the sheet to remove all traces of acid.

The novel laminated structure of this invention is of especial advantage in the fabrication of vessels and the like, in which complementary parts are assembled and united by brazing. For instance, as illustrated in Figure 4, the laminated sheet, prepared as described above, after pickling and washing may be pressed to form crisscross indentations such as 4 and 5. The indented sheet may then be joined to a second similarly indented sheet of copper-base metal, not having any surface coating of brazing alloy, merely by bringing the complementary parts together and heating in a non-oxidizing or preferably a reducing atmosphere so that the brazing alloy on surfaces 6 welds the parts together and thus forms a vessel-like structure suitable for heat interchangers, etc. Although no flux is essential for such a brazing operation with the copper-phosphorus brazing alloy, a suitable flux may be employed if desired when the surfaces are not clean.

The copper-base metal upon which the layer of copper-phosphorus brazing alloy is applied may, as described in the specific example above, be composed solely of deoxidized copper, or it may be composed of any of the ordinary copper alloys such as brass, bronze, "nickel-silver," or, for instance, copper-iron or copper-iron-zinc alloys such as are described in U. S. Letters Patent No. 2,295,180, issued to E. G. Mitchell, September 8, 1942, or any other suitable copper alloy, and the term "copper-base metal" is used herein and in the claims in a sense inclusive of such metals and alloys as well as ferrous and other metal structures clad with any of such metals or alloys.

The copper-phosphorus brazing alloy employed may be any of the well-known copper-phosphorus brazing alloys, and may contain merely copper and phosphorus in suitable proportions, such as 2% to 10% phosphorus and preferably about 8.3%, or may contain additional ingredients for instance zinc, silver, silicon, cadmium, or indium, which may be utilized to modify and improve the characteristics of the alloy without destroying its effectiveness as a brazing medium.

The copper-base metal may be completely covered with the brazing alloy, or may be in the form of a structure 1 having a layer of the brazing alloy 3 only on one side as illustrated in Figures 2 and 4, or as illustrated in Figure 3 may have the brazing alloy 3 on both flat surfaces.

Vessels and other articles fabricated by brazing, spot-welding, etc., employing the laminated structures of this invention have no tendency to open at the seams, the weld ordinarily having greater strength than the copper-base metal. Brazing operations are rendered relatively easy to manipulate, merely requiring that the parts be brought into contact and heated in a suitable atmosphere, thus eliminating all difficult handling of the brazing alloy and flux. The welds obtained are in general much better than when the brazing alloy is applied from a rod or inserted strip, since a uniformly adequate portion of the brazing alloy is available at all points where needed and any fillets between the parts are adequately filled to form good tight joints.

This invention accordingly provides a novel method for producing a laminated structure which greatly facilitates the art of brazing and simplifies the fabrication of articles formed by joining copper-base metal parts. While the invention has been described in the foregoing with particular reference to the specific examples, it will be understood that these are illustrative and that variations may be made without departing from the spirit and scope of the invention, as expressed in the appended claims.

Having now described the invention, what is claimed as new and is desired to be secured by Letters Patent, is:

1. The method of forming a composite structure having an exposed surface layer of copper-phosphorus brazing alloy which comprises applying to a copper-base metal sheet a powdered layer of a copper-phosphorus brazing alloy having a melting point lower than the melting point of the copper-base metal sheet, heating the sheet and superposed layer in a non-oxidizing atmosphere at a temperature above the melting point of said layer but below the melting point of said sheet for a length of time sufficient to cause the brazing alloy to form a molten layer on said sheet, cooling the molten layer to a temperature below the melting point of the brazing alloy to form a fusion bond between said brazing alloy layer and said sheet, and pickling the resulting composite structure in a bath containing nitric acid, the concentration of the nitric acid in said bath and the duration of the pickling operation being such as to substantially increase the ductility and workability of the brazing alloy layer.

2. The method of claim 1 in which the non-oxidizing atmosphere is an inert one.

3. The method of claim 1 in which the non-oxidizing atmosphere is a reducing one.

4. The method of claim 1 in which the cooling of the molten layer takes place in a non-oxidizing atmosphere.

5. The method of claim 1 in which the brazing alloy contains from 2% to 10% of phosphorus.

6. The method of claim 1 in which the brazing alloy is applied to the copper-base metal sheet in the form of a non-coherent mass of powder.

7. The method of claim 1 in which the copper-base metal sheet has a clean oxide-free surface.

8. In a method of forming a composite vessel-like structure, the steps which comprise applying to a copper-base metal sheet a powdered layer of a copper-phosphorus brazing alloy containing from 2% to 10% of phosphorus and having a melting point lower than the melting point of the copper-base metal sheet, heating the sheet and superposed layer in a non-oxidizing atmosphere at a temperature above the melting point of said layer, but below the melting point of said sheet, to form a molten layer on said sheet, cooling the sheet and molten layer to a temperature below the melting point of the brazing alloy to form a fusion bond between said brazing alloy layer and said sheet, pickling the resulting composite structure in a bath containing nitric acid, the concentration of the nitric acid in said bath and the duration of the pickling operation being such as to substantially increase the ductility and workability of the brazing alloy layer, and indenting said pickled sheet in a predetermined pattern to form a component of said vessel-like structure, said indented sheet being adapted to be disposed in face-to-face contact with a complementary component of said vessel-like structure with the alloy surface therebetween and thereafter to be heated to securely join said complementary components.

EDMUND G. MITCHELL.
DE WILTON B. TIMBERMAN.

References Cited in the file of this patent

UNITED STATES PATENTS

| Number | Name | Date |
| --- | --- | --- |
| 268,478 | Fitch | Dec. 5, 1882 |
| 296,074 | Shaw | Apr. 1, 1884 |
| 1,225,956 | Hoffman | May 15, 1917 |
| 1,651,709 | Jones | Dec. 6, 1927 |
| 1,652,107 | Eschholz | Dec. 6, 1927 |
| 1,700,173 | Marshall | Jan. 29, 1929 |
| 1,816,837 | Ganser | Aug. 4, 1931 |
| 2,101,950 | McGohan | Dec. 14, 1937 |
| 2,174,733 | Chace | Oct. 3, 1939 |
| 2,198,254 | Koehring | Apr. 23, 1940 |
| 2,251,410 | Koehring | Aug. 5, 1941 |
| 2,241,789 | Queneau et al. | May 13, 1941 |
| 2,289,658 | Koehring | July 14, 1942 |
| 2,297,554 | Hardy et al. | Sept. 29, 1942 |
| 2,290,338 | Koehring | July 21, 1942 |
| 2,390,452 | Mudge | Dec. 4, 1945 |
| 2,372,607 | Schwarzkopf | Mar. 27, 1945 |

FOREIGN PATENTS

| Number | Country | Date |
| --- | --- | --- |
| 474,064 | Great Britain | Jan. 17, 1936 |